United States Patent
Wu et al.

(10) Patent No.: US 9,797,054 B2
(45) Date of Patent: Oct. 24, 2017

(54) PRESSURE DRIVEN CERAMIC OXYGEN GENERATION SYSTEM WITH INTEGRATED MANIFOLD AND TUBES

(71) Applicant: Carleton Life Support Systems, Inc., Davenport, IA (US)

(72) Inventors: Zhonglin Wu, Bettendorf, IA (US); Courtney J. Monzyk, Davenport, IA (US); Scott R. Sehlin, Bettendorf, IA (US)

(73) Assignee: Carleton Life Support Systems Inc., Davenport, IA (US)

( * ) Notice: Subject to any disclaimer, the term of this patent is extended or adjusted under 35 U.S.C. 154(b) by 97 days.

(21) Appl. No.: 14/326,934

(22) Filed: Jul. 9, 2014

(65) Prior Publication Data

US 2016/0010230 A1 Jan. 14, 2016

(51) Int. Cl.
*B01D 63/06* (2006.01)
*B01D 53/22* (2006.01)
(Continued)

(52) U.S. Cl.
CPC ............ *C25B 13/04* (2013.01); *B01D 53/228* (2013.01); *B01D 63/06* (2013.01);
(Continued)

(58) Field of Classification Search
CPC B01D 2053/223; B01D 53/228; B01D 63/06; C01B 13/0255
See application file for complete search history.

(56) References Cited

U.S. PATENT DOCUMENTS

| | | |
|---|---|---|
| 4,508,548 A | 4/1985 | Manatt |
| 5,108,465 A | 4/1992 | Bauer et al. |

(Continued)

FOREIGN PATENT DOCUMENTS

| | | |
|---|---|---|
| GB | 2257054 | 6/1993 |
| JP | 2003218096 | 7/2003 |

(Continued)

OTHER PUBLICATIONS

Guizard et al., Recent Advances in Gas Separation by Microporous Ceramic Membranes; Kanellopoulos, Ed.; Elsevier: Amsterdam, The Netherlands, 2000; 6, pp. 460-462.
(Continued)

*Primary Examiner* — Nicholas A Smith
(74) *Attorney, Agent, or Firm* — Woods Oviatt Gilman LLP; Katherine H. McGuire, Esq.

(57) ABSTRACT

A mixed conducting ceramic element comprises a plurality of tubes each having interior and exterior surfaces, a closed end and an open end. A tube support member receives the open ends of the tubes. The ceramic element has a general composition of $A_x A'_{x'} A''_{x''} B_y B'_{y'} B''_{y''} O_{3-z}$, where A, A' and A" are selected from Group II elements or the Lanthanoids, and B, B' and B" are selected from the d-block transition metals, and wherein $0 < x \leq 1$, $0 < x' \leq 1$, $0 < x'' \leq 1$, $0 < y \leq 1$, $0 < y' \leq 1$, $0 < y'' \leq 1$, $x+x'+x'' \approx 1$, $y+y'+y'' \approx 1$, and z is selected so that the resultant composition is charge neutral. The ceramic element can be a composite consisting of two or more component materials, wherein one component is predominantly an electronic conductor and another is predominantly an ionic conductor. The ceramic element may also be a composite material containing at least one component material having a chemical composition of $A_x A'_{x'} A''_{x''} B_y B'_{y'} B''_{y''} O_{3-z}$.

13 Claims, 3 Drawing Sheets

(51) Int. Cl.
*C01B 13/02* (2006.01)
*C25B 1/02* (2006.01)
*C25B 13/04* (2006.01)
*H01B 1/08* (2006.01)

(52) U.S. Cl.
CPC ............ *C01B 13/0255* (2013.01); *C25B 1/02* (2013.01); *H01B 1/08* (2013.01); *B01D 2053/223* (2013.01)

(56) References Cited

U.S. PATENT DOCUMENTS

| | | |
|---|---|---|
| 5,131,225 A | 7/1992 | Roettger |
| 5,155,158 A | 10/1992 | Kim |
| 5,169,415 A | 12/1992 | Roettger et al. |
| 5,186,793 A | 2/1993 | Michaels |
| 5,397,443 A | 3/1995 | Michaels |
| 5,766,317 A | 6/1998 | Cable et al. |
| 5,871,624 A | 2/1999 | Crome |
| 5,888,272 A | 3/1999 | Prasad et al. |
| 5,910,238 A | 6/1999 | Cable et al. |
| 5,922,178 A | 7/1999 | Isenberg |
| 5,985,113 A | 11/1999 | Crome et al. |
| 6,117,210 A | 9/2000 | Prasad et al. |
| 6,139,604 A | 10/2000 | Gottzmann et al. |
| 6,153,163 A | 11/2000 | Prasad et al. |
| 6,194,335 B1 | 2/2001 | Crome et al. |
| 6,293,084 B1 | 9/2001 | Drnevich et al. |
| 6,309,612 B1 | 10/2001 | Balachandran et al. |
| 6,352,624 B1 | 3/2002 | Crome et al. |
| 6,368,383 B1 | 4/2002 | Virkar et al. |
| 6,368,491 B1 | 4/2002 | Cao et al. |
| 6,406,518 B1 | 6/2002 | Bonaquist et al. |
| 6,592,782 B2 | 7/2003 | MacKay et al. |
| 6,685,235 B1 | 2/2004 | Hart |
| 6,783,646 B2 | 8/2004 | Sehlin et al. |
| 6,849,296 B2 | 2/2005 | Wu et al. |
| 6,979,511 B2 | 12/2005 | Visco et al. |
| 7,309,847 B2 | 12/2007 | Cao |
| 7,396,442 B2 | 7/2008 | Bagby et al. |
| 7,442,344 B2 | 10/2008 | Suzuki et al. |
| 7,645,365 B2 | 1/2010 | Wu et al. |
| 7,694,674 B2 | 4/2010 | Crome et al. |
| 8,070,922 B2 | 12/2011 | Nelson et al. |
| 8,283,077 B1 | 10/2012 | Visco et al. |
| 8,394,178 B2 | 3/2013 | Van Brunt et al. |
| 8,500,872 B2 | 8/2013 | Riess |
| 2004/0065541 A1 | 4/2004 | Sehlin |
| 2009/0272266 A1 | 11/2009 | Werth et al. |
| 2011/0275866 A1* | 11/2011 | Underwood ........... B01D 53/22 568/959 |
| 2012/0000360 A1 | 1/2012 | Richet et al. |
| 2012/0067210 A1* | 3/2012 | Sane .................... B01D 71/022 95/51 |
| 2012/0318145 A1 | 12/2012 | Hilbig et al. |
| 2012/0325678 A1 | 12/2012 | Visco et al. |
| 2013/0032760 A1 | 2/2013 | Werth |
| 2013/0145933 A1 | 6/2013 | Van Brunt et al. |
| 2013/0220127 A1 | 8/2013 | Christie et al. |

FOREIGN PATENT DOCUMENTS

| | | |
|---|---|---|
| JP | 2004022202 | 1/2004 |
| JP | 2010052980 | 3/2010 |

OTHER PUBLICATIONS

Joshi et al., Solid electrolyte material, devices, and applications, J. Electroceram. [Online] 2004, 13, pp. 619-625.

Li, K., Ceramic Membranes for Separation and Reaction; John Wiley & Sons: West Sussex, England, 2007; pp. 183-193.

Sunarso et al., Mixed ionic-electronic conducting (MIEC) ceramic-based membranes for oxygen separation, J. Membrane Sci. [Online] 2008, 320, pp. 13-41.

Wright et al., Advanced oxygen-separation membranes, Gas Research Institute, 1990.

* cited by examiner

PRESSURE DRIVEN CERAMIC OXYGEN GENERATION SYSTEM WITH INTEGRATED MANIFOLD AND TUBES

BACKGROUND OF THE INVENTION

The present invention relates to devices for separating oxygen from a more complex gas containing oxygen to deliver the separated oxygen for use, and more particularly, the invention relates to solid state electrochemical devices for separating oxygen from a more complex gas, and even more particularly to a pressure driven ceramic oxygen generating system with integrated manifold and tubes.

In principle, there are several types of oxygen concentration systems: adsorption, polymer membrane, electrolysis, chemical processing, cryogenic processing and ceramic oxygen generation. Each of these systems has a unique combination of flow rate, oxygen purity, pressure, and use pattern. Ceramic Oxygen Generating Systems (COGS) are unique in that they provide extremely high purity oxygen due to the fact that the ceramic materials used in the systems allow only oxygen to pass through the material.

The present invention takes advantage of the phenomenon that, when raised to sufficient temperature (over 600° C.), certain ceramic materials can easily have oxygen ions dislodged from within the ceramic's lattice structure. That is, when these materials are formed into a thin membrane, a driving force and a fresh oxygen supply on one side of the membrane induce a flow of oxygen through the membrane. Since the oxygen ions that migrate through the membrane are actually elemental constituents of the ceramic lattice, only oxygen can flow through the membrane. Other gaseous species, such as nitrogen or argon, cannot migrate through the lattice as these species are incompatible with the ceramic lattice structure. As a result, the derived concentrated product gas stream contains high purity oxygen gas.

Oxygen flow across a ceramic membrane is commonly induced through two methods: electrically driven or pressure driven. In an electrically driven system, an electric potential is induced across the ceramic membrane using special coatings and a voltage supply. The oxygen ions present within the ceramic when at high temperature (over 600° C.) are driven through the membrane by the voltage difference between opposing surfaces of the membrane. Since the oxygen ions are charged species, the number of ions migrating through the membrane is directly related to the magnitude of the electrical current passing through the membrane where higher currents result in more ion migration.

In a pressure driven system, the ceramic is comprised of a mixed conductor composition which can conduct both oxygen ions and electrons. An inlet compressed air source and/or a vacuum outlet at the product side generate a pressure differential across the ceramic membrane. Under elevated temperature, the ceramic membrane ionizes oxygen molecules on the membrane surface exposed to gases with higher oxygen partial pressure. Oxygen ions then diffuse across the ceramic membrane and recombine into oxygen molecules at the opposite surface which has lower oxygen partial pressure. As discussed above, only oxygen ions are compatible with the ceramic lattice such that only oxygen gas is generated at the product outlet, thereby producing an extremely high purity oxygen gas product.

One approach to producing ceramic membrane materials for use with COGS systems is the Integrated Manifold and Tubes (IMAT) module design. For example, U.S. Pat. Nos. 5,871,624; 5,985,113; 6,352,624; 6,685,235; and 6,783,646, each owned by the assignee and incorporated in their entireties herein, teach IMAT designs for use in an oxygen generating system. However, such prior IMAT designs are limited to electrically driven COGS systems. As required by such electrically driven systems, the prior MINT designs include the provisions of a number of additional conductive coatings and methods of producing parallel and serial electrical connections between the individual tubes within the modular array. The additional coatings and electrical connections increase the complexity of the system and time required to produce a complete module. Further, any surface area other than that coated by the conductive coating is unavailable for generating oxygen, thus leading to decreased utilization potential of the ceramic membrane materials. Still further, to achieve the desired oxygen generating performance, the size and thickness of each tube within the array needs to be closely matched (if not exactly the same) so that there would be relatively uniform distribution of voltages for the components connected in serial relation. This requires tight design tolerances and vigilant quality control. Yet still further, due to the relatively large magnitudes of electrical current passing through the IMAT, self-heating of the ceramic is significant and requires careful thermal management to optimize oxygen production without damaging or destroying the IMAT module.

It is therefore an object of this invention to provide a ceramic oxygen generator for a pressure driven COGS system thereby obviating the need for conductive coatings and associated electrical connections.

Another object of this invention is to provide a ceramic oxygen generator for a pressure driven COGS system wherein the ceramic material comprises a mixed conducting material.

A further object of this invention is to provide a ceramic oxygen generator for a pressure driven COGS system wherein a manifold structure for receiving the separated oxygen is an integral part of the manufactured generator structure and is less costly to make.

Still another object or this invention is to provide a ceramic oxygen generator for a pressure driven COGS system which is of a modular configuration and thereby provides a simple "building block" approach to meet differing requirements for amounts of oxygen to be generated.

SUMMARY OF THE INVENTION

The present invention addresses the above needs by providing a solid state electrochemical device for separating oxygen from a more complex gas. In particular, the oxygen separation device utilizes a class of ceramic materials which can simultaneously conduct ionic species (i.e., oxygen ions and oxygen vacancies) and electronic species (i.e., electrons and holes)—commonly referred to as a mixed conducting membrane. The ceramic material is generally comprised of a metallic oxide composition and may have the general chemical composition of $A_xA'_{x'}A''_{x''}B_yB'_{y'}B''_{y''}O_{3-z}$, where A, A', and A'' are selected from Group II elements or the Lanthanoids, and B, B', B'' are selected from the d-block transition metals, and more particularly the d-block transition metals of Period 4, wherein $0<x\leq1$, $0\leq x'\leq1$, $0\leq x''\leq1$, $0<y\leq1$, $0\leq y'\leq1$, $0\leq y''\leq1$, $x+x'+x''\approx1$, $y+y'+y''\approx1$, and z is selected so that the resultant composition is charge neutral. The ceramic membrane material can also be a composite consisting of two or more component materials, of which one component is predominantly an electronic conductor and another is predominantly an ionic conductor. Further, the ceramic membrane material may also be a composite material containing at least one component material with a general chemical composition of $A_xA'_{x'}A''_{x''}B_yB'_{y'}B''_{y''}O_{3-z}$. In accordance with an embodiment of the present invention, the ceramic mixed conductor may be a mixed conducting metal oxide having a composition selected from, without necessarily limiting thereto, one of the following: $BaTi_{0.2}Co_{0.4}Fe_{0.4}O_{3-z}$, $BaTi^{0.2}Co_{0.5}Fe_{0.3}O_{3-z}$, $Ba_{0.5}Sr_{0.5}Zn_{0.2}Fe_{0.8}O_{3-z}$, $Ba_{0.5}Sr_{0.5}Co_{0.8}Fe_{0.3}O_{3-z}$, $SrCo_{0.8}Fe_{0.2}O_{3-z}$, $La_{0.6}Ba_{0.4}Co_{0.8}Fe_{0.2}O_{3-z}$, Ag-doped $ZrO_2$, Pt-doped $CeO_2$, or a composite with one of above materials as one of the components.

According to one aspect of the present invention, a mixed conducting ceramic element comprises a plurality of tubes each having interior and exterior surfaces, and each having a closed end and an open end. A tube support member receives the open ends of the plurality of tubes. The ceramic element has a general composition of $A_xA'_{x'}A''_{x''}B_yB'_{y'}B''_{y''}O_{3-z}$, where A, A', and A'' are selected from Group II elements or the Lanthanoids, and B, B', B'' are selected from the d-block transition metals, and wherein $0<x\leq1$, $0\leq x'\leq1$, $0\leq x''\leq1$, $0<y\leq1$, $0\leq y'\leq1$, $0\leq y''\leq1$, $x+x'+x''\approx1$, $y+y'+y''\approx1$, and z is selected so that the resultant composition is charge neutral. In accordance with the invention, the d-block transition metals may be selected from the d-block transition metals of Period 4. In certain embodiments, the ceramic material is comprised of a composition selected from the list consisting of $BaTi_{0.2}Co_{0.4}Fe_{0.4}O_{3-z}$, $BaTi_{0.2}Co_{0.5}Fe_{0.3}O_{3-z}$, $Ba_{0.5}Sr_{0.5}Zn_{0.2}Fe_{0.8}O_{3-z}$, $Ba_{0.5}Sr_{0.5}Co_{0.8}Fe_{0.3}O_{3-z}$, $SrCo_{0.8}Fe_{0.2}O_{3-z}$ and $La_{0.6}Ba_{0.4}Co_{0.8}Fe_{0.2}O_{3-z}$. The ceramic membrane material can also be a composite consisting of two or more component materials, of which one component is predominantly an electronic conductor and another is predominantly an ionic conductor. Further, the ceramic membrane material may also be a composite material containing at least one component material with a general chemical composition of $A_xA'_{x'}A''_{x''}B_yB'_{y'}B''_{y''}O_{3-z}$.

According to a further aspect of the present invention, an oxygen generator comprises a first mixed conducting ceramic element having a first tube support member and a first array of tube members extending from the first tube support member and formed into columns and rows. A second mixed conducting ceramic element has a second tube support member and a second array of tube members extending from the second tube support member and formed into columns and rows. A seal is formed between the first tube support member of the first mixed conducting ceramic element and the second tube support member of the second mixed conducting ceramic element so as to define a manifold having and open interior space therebetween. In accordance with this further aspect, the first mixed conducting ceramic element and the second mixed conducting ceramic element may comprise a composition of $A_xA'_{x'}A''_{x''}B_yB'_{y'}B''_{y''}O_{3-z}$, where A, A', and A'' are selected from Group II elements or the Lanthanoids, and B, B', B'' are selected from the d-block transition metals, and wherein $0<x\leq1$, $0\leq x'\leq1$, $0\leq x''\leq1$, $0<y\leq1$, $0\leq y'\leq1$, $0\leq y''\leq1$, $x+x'+x''\approx1$, $y+y'+y''\approx1$, and z is selected so that the resultant composition is charge neutral. The ceramic membrane material can also be a composite consisting of two or more component materials, of which one component is predominantly an electronic conductor and another is predominantly an ionic conductor. Further, the ceramic membrane material may also be a composite material containing at least one component material with a general chemical composition of $A_xA'_{x'}A''_{x''}B_yB'_{y'}B''_{y''}O_{3-z}$. Each respective tube support member and array of tube members of each of the first mixed conducting ceramic element and the second mixed conducting ceramic element is integrally formed. The oxygen generator may further include an outlet port in communication with the interior space of the manifold.

BRIEF DESCRIPTION OF THE DRAWINGS

The principles of the intention will be more readily understood by reference to the description of a preferred embodiment given below along with the drawings which are briefly described as follow.

DETAILED DESCRIPTION

Figure 1:
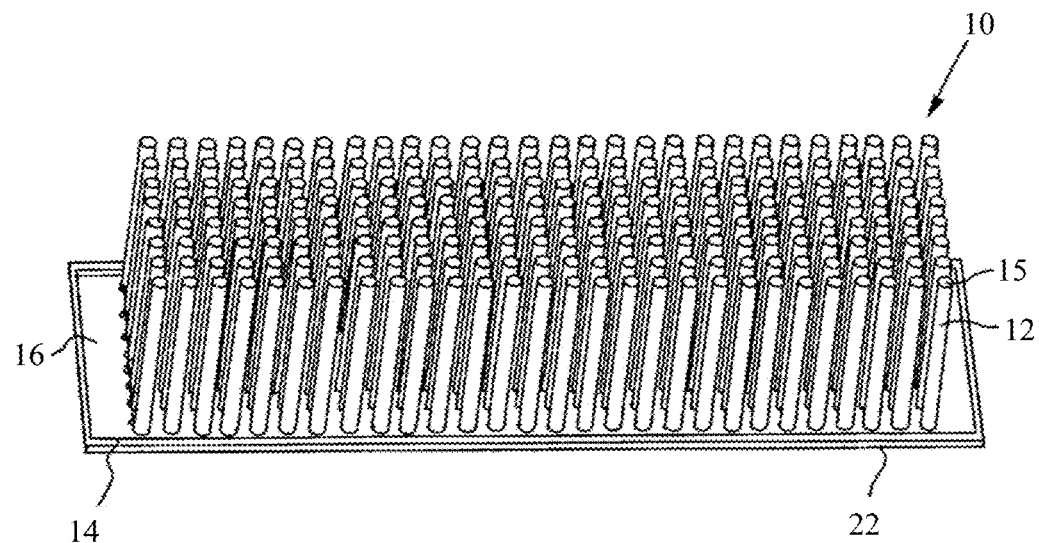
FIG. 1 is a top perspective view of one of the molded, modular elements used to form a module assembly of two molded elements creating the mixed conducting ceramic oxygen generator module assembly according to the invention.

In each of the figures of the drawings like elements are referred to with like reference numerals.

As shown in FIG. 1, the mixed conducting ceramic oxygen generating assembly according to the invention is generally comprised of modular elements 10. Modular element 10 can be, for example, injection molded of a mixed conducting ceramic electrolyte, and preferably has the composition $A_xA'_{x'}A''_{x''}B_yB'_{y'}B''_{y''}O_{3-z}$, where A, A', and A'' are selected from Group II elements or the Lanthanoids, and B, B', B'' are selected from the d-block transition metals, and wherein $0<x\leq1$, $0\leq x'\leq1$, $0\leq x''\leq1$, $0<y\leq1$, $0\leq y'\leq1$, $0\leq y''\leq1$, $x+x'+x''\approx1$, $y+y'+y''\approx1$, and z is selected so that the resultant composition is charge neutral. In accordance with the present invention, examples of suitable mixed conducting ceramic materials include, but are not necessarily limited solely thereto, $BaTi_{0.2}Co_{0.4}Fe_{0.4}O_{3-z}$, $BaTi_{0.2}Co_{0.5}Fe_{0.3}O_{3-z}$, $Ba_{0.5}Sr_{0.5}Zn_{0.2}Fe_{0.8}O_{3-z}$, $Ba_{0.5}Sr_{0.5}Co_{0.8}Fe_{0.3}O_{3-z}$, $SrCo_{0.8}Fe_{0.2}O_{3-z}$ and $La_{0.6}Ba_{0.4}Co_{0.8}Fe_{0.2}O_{3-z}$. The ceramic membrane material can also be a composite consisting of two or more component materials, of which one component is predominantly an electronic conductor and another is predominantly an ionic conductor. Further, the ceramic membrane material may also be a composite material containing at least one component material with a general chemical composition of $A_xA'_{x'}A''_{x''}B_yB'_{y'}B''_{y''}O_{3-z}$. Modular element 10 is generally constructed as an integrated Manifold and Tithes (IMAT) module design thereby providing a large surface area per unit volume. The IMAT design also includes an integral manifold structure (described below) for collecting oxygen.

The injection molding process used to generate modular element 10 permits the mixed conductive ceramic material to be formed into a series of tubes 12 extending from a top surface 16 of a generally planar tube support member 14. While tube support member 14 is shown and described as generally planar, it is envisioned that the tube support member may be constructed to include any desired shape, provided that two opposing base surfaces can be sealed together to form the integral manifold structure (described below). The tubes may be formed to include any number of rows and columns of tubes in an array, where such number of tubes may be dictated by the overall size of the generator or the envisioned maximum oxygen demand placed upon the system. By way of example and as shown in FIG. 1, the tubes 12 may be formed into twenty-eight columns of eight tubes each, or stated another way, eight rows of twenty-eight tubes each. The distal end of each tube 12 is closed at cap end 15.

Figure 2:
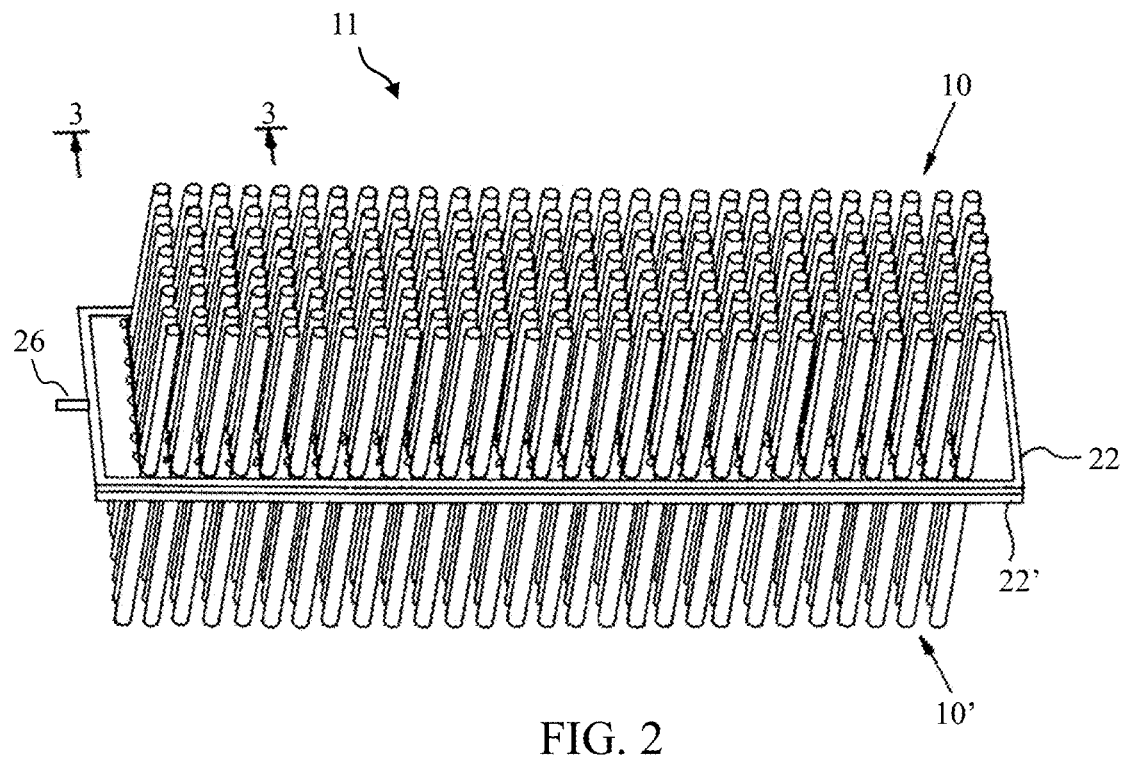
FIG. 2 is a top perspective view of the two of molded elements shown in FIG. 1 formed into a module assembly.
Figure 3:
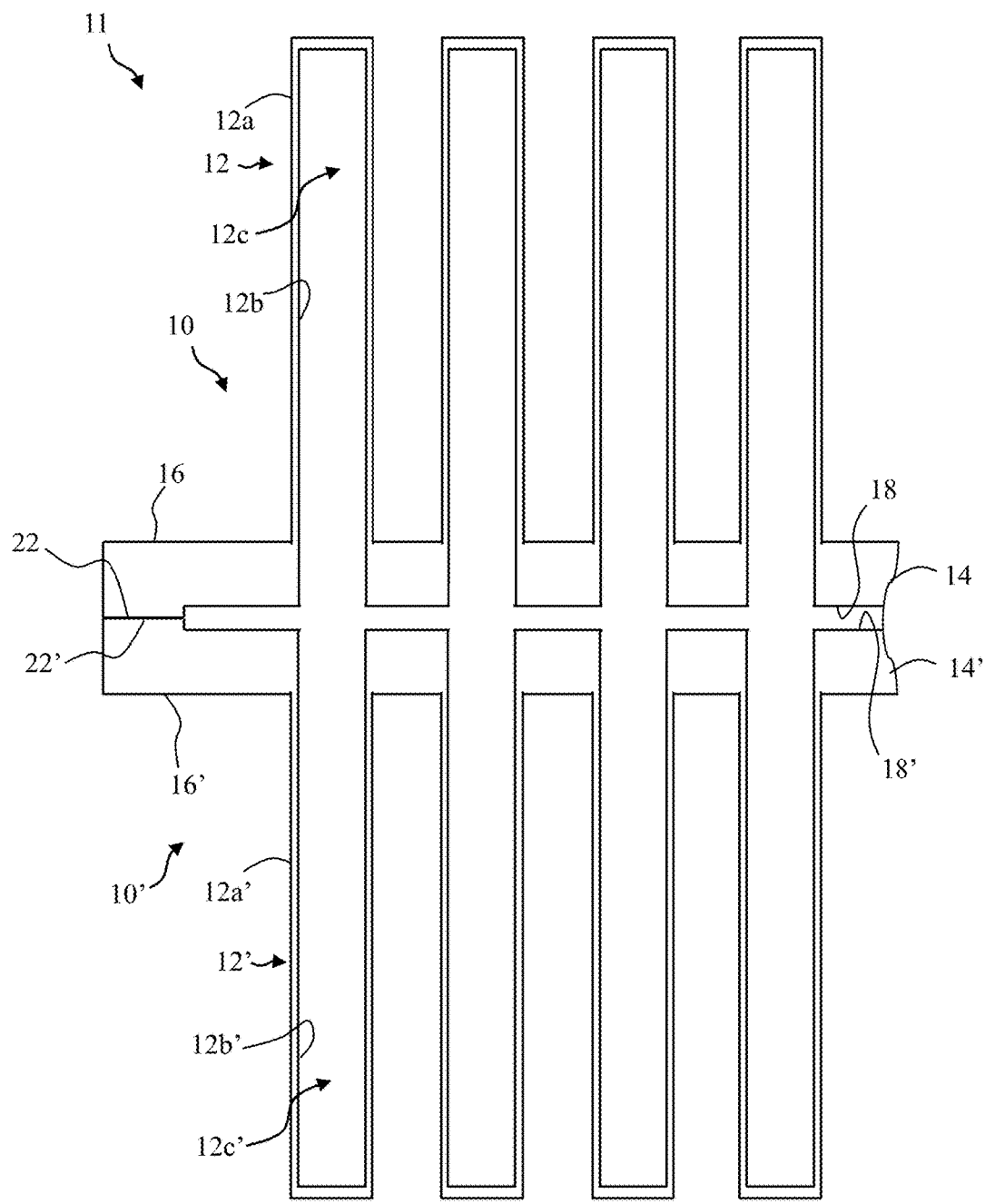
FIG. 3 is a partial cross sectional vie v taken along the line 3-3 of FIG. 1.

As is shown in FIGS. 2 and 3, the symmetry of the modular design of element 10 allows a second element 10' to be inverted and sealed to the first element to form an assembly 11. A flange member 22 extends outwardly from the lower surface 18 of tube support member 14 around the perimeter thereof so that when the elements 10 and 10' are placed together as in FIG. 2, the flange members 22 and 22' are joined to form a manifold with an interior space 24 between the lower surfaces 18/18' of the two elements 10 and 10'. An exit port 26 is defined by the union of tube support members 14/14' and communicates with the interior space 24 of the manifold. While shown along one end, one or more outlet ports could also exit along each end or along the longer edges of the elements 10 and 10' so as to allow serial connection of multiple assemblies 11 in end-to-end or side-by-side connections as desired or dictated by system demands.

Figure 4:
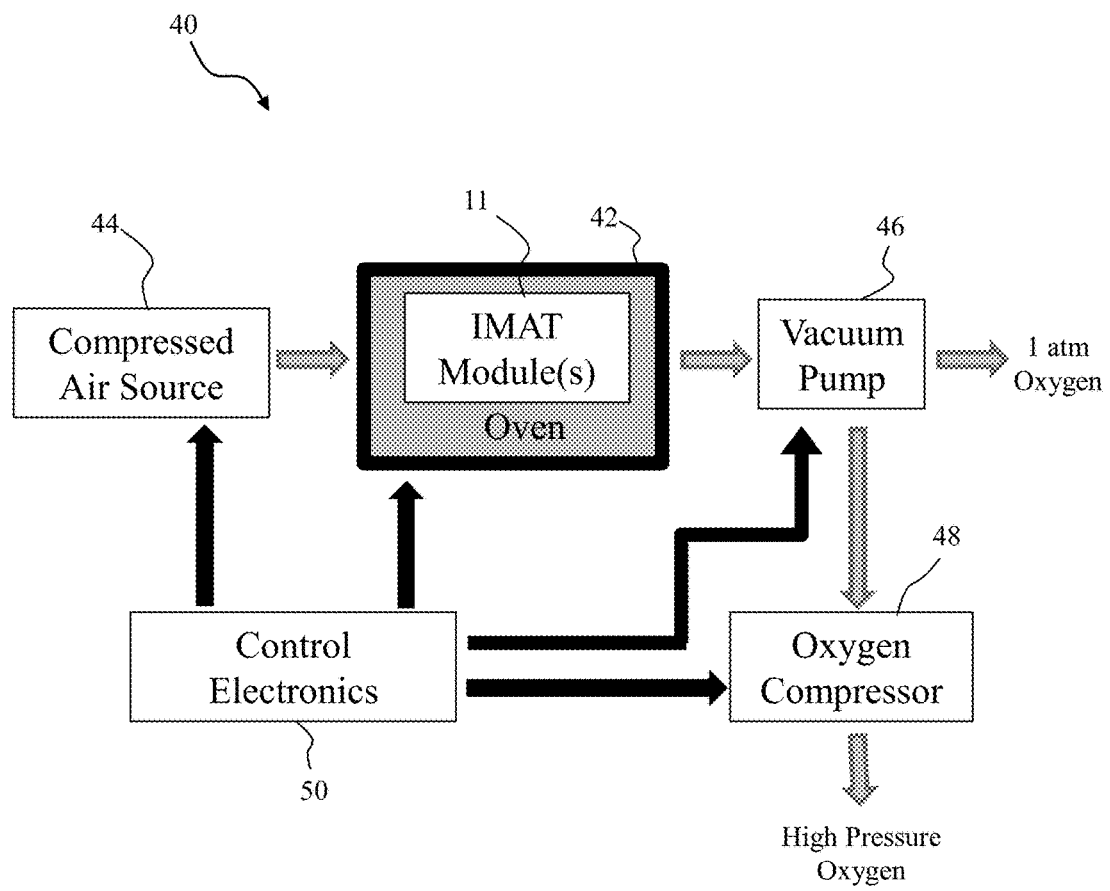
FIG. 4 is a block schematic diagram of a pressure driven mixed conducting ceramic oxygen generating system with integrated manifold and tubes in accordance with the invention.

As shown generally within the block schematic of a pressure driven COGS system 40 of FIG. 4 (with reference to FIGS. 2 and 3), one or more IMAT modules 11 may be situated within an oven 42. As described above, the IMAT modules are sufficiently heated (i.e. over 600° C., within oven 42) to cause ionization of oxygen molecules on the ceramic membrane surface and sufficient conductivity of oxygen ions within the ceramic lattice material. Air or other gas from which oxygen is to be extracted enters the oven and flows across the tubes 12. A pressure differential is created between the external surface of 12a/12a' and internal surface 12b/12b' of each tube 12/12'. This pressure differential may be created by introducing compressed gas into the oven through compressed air source 44 and/or by generating a negative pressure within interior space 24 and tube interiors 12c/12c' by way of a vacuum pump 46.

As discussed hereinabove, this pressure differential drives oxygen ions through the mixed conductive ceramic membrane material such that the ions reform oxygen gas in the interiors 12c/12c' of tubes 12/12', with the gas being collected in interior space 24 of the manifold. This supply of oxygen is communicated via port 26 to a component having the oxygen requirement or storage (such as through vacuum pump 46). For instance, if the generated oxygen is for immediate use, the gas pressure may be reduced to atmospheric pressure for eventual delivery to a cannula or gasmask. Alternatively, oxygen may also be delivered to an oxygen compressor 48 for pressurization of oxygen storage cylinders for later use. A control unit 50 may be in operational communication with each of the oven 42, compressed air source 44, vacuum pump 46 and/or oxygen compressor 48.

It is to be understood that while circular or cylindrical tubes having exterior and interior surfaces are shown in the described embodiment other configurations for the "tubes" could be used and the term "tube" is used herein only for purposes of convenience of reference.

The principles of this invention are described hereinabove by describing a preferred embodiment constructed according to those principles. It will be understood that the described embodiment can be modified or changed in a number of ways without departing from the spirit and scope of the invention as defined by the appended claims.

What is claimed is:

1. An oxygen generating element comprising:
a plurality of mixed conducting ceramic tubes each having interior and exterior surfaces, and each having a closed end and an open end; and a mixed conducting ceramic tube support member located at said open ends of said plurality of tubes, wherein said plurality of tubes and said tube support member are formed as a single, non-separable unit.

2. The oxygen generating element described in claim 1 wherein said plurality of tubes is formed into rows and columns on said tube support member.

3. The oxygen generating element described in claim 1, wherein each the plurality of tubes is spaced from adjacent tubes.

4. The oxygen generating element described in claim 1, wherein said element comprises a composition of $A_xA'_{x'}A''_{x''}B_yB'_{y'}B''_{y''}O_{3-z}$, where A, A' and A'' are selected from Group II elements or the Lanthanoids, and B, B' and B'' are selected from the d-block transition metals, and wherein $0<x\leq1$, $0\leq x'\leq1$, $0\leq x''\leq1$, $0<y\leq1$, $0\leq y'\leq1$, $0\leq y''\leq1$, $x+x'+x''=1\pm0.05$, $y+y'+y''=1\pm0.05$, and z is selected so that the resultant composition is charge neutral.

5. The oxygen generating element described in claim 1, wherein said ceramic element is a composite material of two or more distinctive component materials with at least one component material having a chemical composition of $A_xA'_{x'}A''_{x''}B_yB'_{y'}B''_{y''}O_{3-z}$, where A, A' and A'' are selected from Group II elements or the Lanthanoids, and B, B' and B'' are selected from the d-block transition metals, and wherein $0<x\leq1$, $0\leq x'\leq1$, $0\leq x''\leq1$, $0<y\leq1$, $0\leq y'\leq1$, $0\leq y''\leq1$, $x+x'+x''=1\pm0.05$, $y+y'+y''=1\pm0.05$, and z is selected so that the resultant composition is charge neutral.

6. The oxygen generating element described in claim 1, wherein said element is a composite of two or more distinctive component materials, wherein at least one component material is predominantly an electronic conductor and at least one other component material is predominantly an ionic conductor.

7. The oxygen generating element described in claim 4, wherein said d-block transition metals are the d-block transition metals of Period 4.

8. The oxygen generating element described in claim 4, wherein said element comprises a composition selected from the list consisting of $BaTi_{0.2}Co_{0.4}Fe_{0.4}O_{3-z}$, $BaTi_{0.2}Co_{0.5}Fe_{0.3}O_{3-z}$, $Ba_{0.5}Sr_{0.5}Zn_{0.2}Fe_{0.8}O_{3-z}$, $Ba_{0.5}Sr_{0.5}Co_{0.8}Fe_{0.3}O_{3-z}$, $SrCo_{0.8}Fe_{0.2}O_{3-z}$, $La_{0.6}Ba_{0.4}Co_{0.8}Fe_{0.2}O_{3-z}$.

9. An oxygen generator, comprising:
a first element having a first mixed conducting ceramic tube support member and a first array of mixed conducting ceramic tube members extending from said first tube support member and formed into columns and rows, wherein said first mixed conducting ceramic tube support member and said first array of mixed conducting ceramic tube members are formed as a single, non-separable unit;
a second element having a second mixed conducting ceramic tube support member and a second array of mixed conducting ceramic tube members extending from said second tube support member and formed into columns and rows, wherein said second mixed conducting ceramic tube support member and said second array of mixed conducting ceramic tube members are formed as a single, non-separable unit; and
a seal between said first tube support member of said first element and said second tube support member of said second element so as to define a manifold having and open interior space therebetween.

10. The oxygen generator of claim 9, wherein each of said first element and said second element comprises a composition of $A_xA'_{x'}A''_{x''}B_yB'_{y'}B''_{y''}O_{3-z}$, where A, A' and A'' are selected from Group II elements or the Lanthanoids, and B, B' and B'' are selected from the d-block transition metals, and wherein $0<x\leq1$, $0\leq x'\leq1$, $0\leq x''\leq1$, $0<y\leq1$, $0\leq y'\leq1$, $0\leq y''\leq1$, $x+x'+x''=1\pm0.05$, $y+y'+y''=1\pm0.05$, and z is selected so that the resultant composition is charge neutral.

11. The oxygen generator of claim 9, wherein each respective element is a composite material of two or more distinctive component materials wherein at least one component material having a chemical composition of $A_xA'_{x'}A''_{x''}B_yB'_{y'}B''_{y''}O_{3-z}$, where A, A' and A'' are selected from Group II elements or the Lanthanoids, and B, B' and B'' are selected from the d-block transition metals, and wherein $0<x\leq1$, $0\leq x'\leq1$, $0\leq x''\leq1$, $0<y\leq1$, $0\leq y'\leq1$, $0\leq y''\leq1$, $x+x'+x''=1\pm0.05$, $y+y'+y''=1\pm0.05$, and z is selected so that the resultant composition is charge neutral.

12. The oxygen generator of claim 9, wherein each respective element is a composite of two or more component materials, wherein at least one component material is predominantly an electronic conductor and at least one other component material is predominantly an ionic conductor.

13. The oxygen generator of claim 9 further including an outlet port in communication with said interior space of said manifold.

* * * * *